(12) United States Patent
Bachle

(10) Patent No.: US 6,354,851 B1
(45) Date of Patent: Mar. 12, 2002

(54) ELECTRICAL CONNECTOR FOR TERMINATING ARMORED CABLE

(75) Inventor: Walter W. Bachle, Pinellas Park, FL (US)

(73) Assignee: EGS Electrical Group LLC, Skokie, IL (US)

( * ) Notice: Subject to any disclaimer, the term of this patent is extended or adjusted under 35 U.S.C. 154(b) by 0 days.

(21) Appl. No.: 09/594,860

(22) Filed: Jun. 15, 2000

(51) Int. Cl.[7] .................................................. H01R 4/66
(52) U.S. Cl. ...................................... 439/98; 174/65 R
(58) Field of Search ................. 439/462, 98; 174/65 R, 174/135

(56) References Cited

U.S. PATENT DOCUMENTS

| | | | | |
|---|---|---|---|---|
| 4,293,178 A | * | 10/1981 | Lee | 439/462 |
| 4,295,005 A | * | 10/1981 | Daugherty et al. | 174/65 R |
| 4,459,463 A | * | 7/1984 | Knowles | 439/98 |
| 5,208,427 A | * | 5/1993 | Couto et al. | 174/65 SS |
| 6,020,557 A | * | 2/2000 | Jorgensen | 174/65 R |
| 6,114,630 A | * | 9/2000 | Gretz | 174/65 R |
| 6,140,582 A | * | 10/2000 | Sheehan | 174/65 G |
| 6,162,995 A | * | 12/2000 | Bachle et al. | 174/151 |

* cited by examiner

Primary Examiner—Neil Abrams
Assistant Examiner—J. F. Duverne
(74) Attorney, Agent, or Firm—Jones, Day, Reavis & Pogue

(57) ABSTRACT

An electrical connector assembly for terminating a free end of a metal clad cable includes a body member and an end nut. A combined friction washer/armor stop is positioned beneath the end nut. By forcing the free end of a cable against the combined friction washer/armor stop a central stop portion of the friction washer/armor stop breaks free and passes into the body member whereupon it abuts an internal shoulder of the body member thereby properly positioning the cable end within the connector assembly.

9 Claims, 5 Drawing Sheets

ELECTRICAL CONNECTOR FOR TERMINATING ARMORED CABLE

BACKGROUND OF THE INVENTION

1. Field of the Invention

The present invention relates generally to an electrical connector for terminating armored cables and, more particularly to a connector having a novel armor stop member for properly positioning the cable end within the connector body.

2. Description of the Related Art

Connectors used to terminate jacketed armor cable, also known as MC (metal clad) cable in the electrical industry, are made having the conductive wire(s) protected with a metal jacket and the metal jacket covered within a jacket of plastic as a waterproof outer cover. The cable's metal jacket is designed to protect the conductors and the plastic jacket is made to protect the armor and conductors from moisture. A connector used to terminate this type of cable must perform several functions. One function is to mechanically hold the armor and jacket to support the cable to a terminal box. Another function is to protect the terminal box from moisture by providing a moisture barrier around the knockout and cable jacket. The connector also mechanically terminates and houses the end of the jacket and armor. It is also important to establish a ground connection between the armor and the connector. To do this the armor end of the cable must be positioned accurately within the connector. An example of such a connector is disclosed in U.S. Pat. No. 4,647,934 issued to Hurtt.

Usually the manufacturer of the connector specifies that the jacket and armor be cut allowing enough length to terminate the conductors. In addition they also specify the length of the plastic jacket to be stripped form the end of the armor. A physical relationship must be established to locate the cable's armor end within the connector so that a ground connection can be made usually with a conductive spring. Most connector designs have an armor stop inside the body which has an opening large enough to pass the conductors through the connector but not allow the armor to pass thus acting as an armor stop. This locates the armor end within the connector preventing the armor end from being pushed through the fitting. It also positions the armor and jacket allowing the ground connection to be made usually by tightening a gland grounding nut(s).

Most connectors are designed to cover a large range of cable sizes. Some cables within the desired armor range have diameters too small to stop cable with small armor diameters. For this reason manufacturers supply an additional wire stop to locate the armor against the armor stop built within the connector thus extending the armor cable range.

This causes several problems for the user installing the connector because the separate armor stop may get lost. Also, when installing the armor stop the stop may be dropped or lost. The decision has to be made whether to use the separate armor stop. To do this the installer has to refer to specifications supplied on an instruction sheet supplied with the fitting, which may specify the range of the separate armor stop. He then has to measure the armor diameter and decide whether to use the separate armor stop or not. This is especially true when the armor stop is assembled within the connector, a common practice. If the installer decides not to use this armor stop assembled within the connector the installer must remove it, typically by disassembling the nut, gland and grounding spring.

After the MC cable is positioned within the fitting, with or without the second armor stop, the gland nut is tightened compressing and securing the cable. If the grommet turns it will put a twisting force on the cable which could turn the cable during the installation process. This results in the twisting of the cable and its conductors during installation. To prevent the grommet from turning and twisting the conductors a friction washer is usually placed between the nut and grommet to reduce the turning forces. This is usually made from a material having a low coefficient of friction such as nylon.

SUMMARY OF THE INVENTION

The present invention improves over the prior art by providing an electrical connector assembly for terminating a free end of a metal clad cable comprising a body member and having an end nut. A combined friction washer/armor stop is positioned beneath the end nut. By forcing the free end of a cable against the combined friction washer/armor stop a central stop portion of the friction washer/armor stop breaks free and passes into the body member whereupon it abuts an internal shoulder of the body member thereby properly positioning the cable end within the connector assembly.

BRIEF DESCRIPTION OF THE DRAWINGS

The foregoing and other novel features and advantages of the invention will be better understood upon a reading of the following detailed description taken in conjunction with the accompanying drawing wherein.

DETAILED DESCRIPTION OF THE PREFERRED EMBODIMENTS

Figure 1:
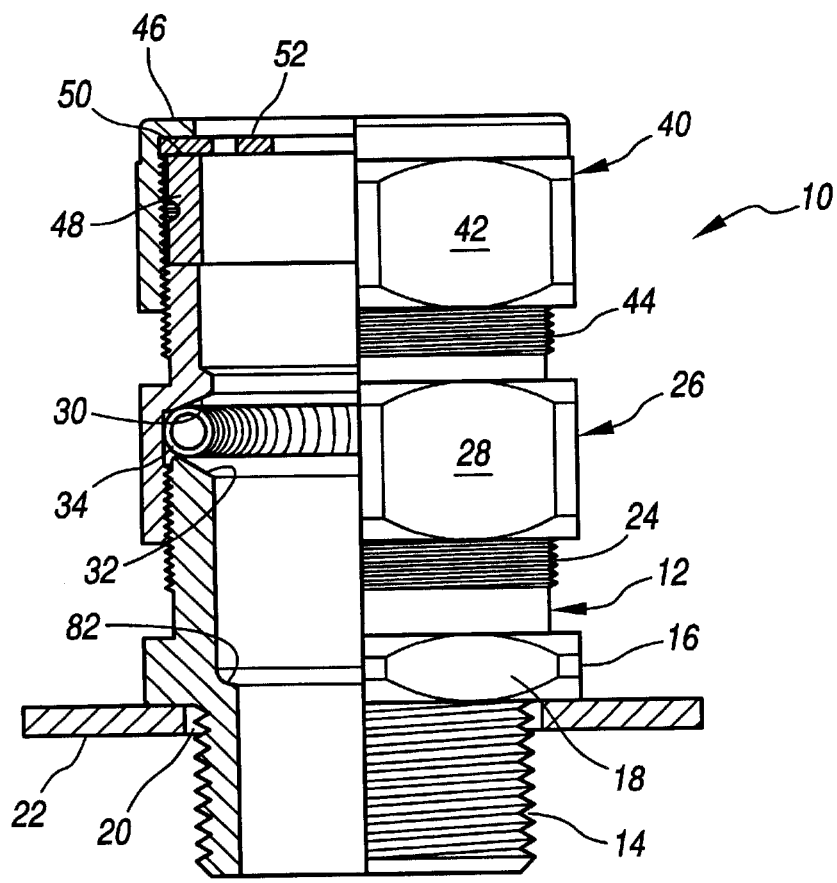
FIG. 1 is a side view, partially broken away, of an electrical connector assembly for terminating armored cable as constructed in accordance with the principles of the invention.

Referring now to the drawings, and initially to FIG. 1, an electrical connector for terminating an armored cable and constructed according to the invention is designated generally by the reference numeral 10. The connector 10 comprises, at a first end, a body member 12 configured with distal threads 14 extending from an enlarged hexagonally-shaped shoulder 16 defining flats 18 which may be used with a suitable wrench to hold the connector 10 as it is tightened with a suitable nut (not shown) in an aperture 20 of a terminal box 22, only a portion of which is shown. Proximal threads 24 are provided on the body member 12 which threadedly receive an intermediate nut 26.

The nut 26 is provided with hexagonally arranged flats 28 for receiving a suitable wrench. The nut 26 is also formed with an inclined internal surface 30 and the body member 12 is formed with an upper inclined internal surface 32, which surfaces 30 and 32 cooperate with a circular metallic spring 34 to compress the spring 34 radially inwardly of the connector 10 as the nut 26 is tightened on the body member 12, for purposes which will be described hereinafter.

Figure 2:
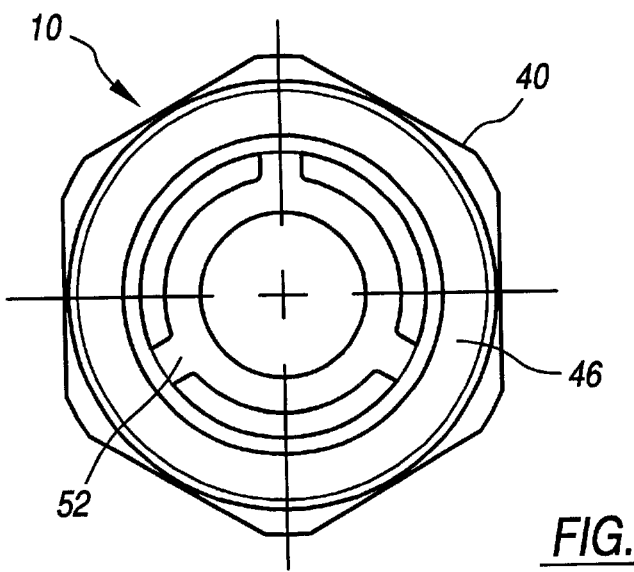
FIG. 2 is a top plan view thereof.

An upper nut 40 having hexagonal flats 42 is received by upper threads 44 formed on the intermediate nut 26. Internal to the nut 40 and dimensioned and configured to abut upper rim 46 of the nut 40 is an annularly shaped grommet 48. Preferably the grommet 48 is made of a resilient rubber material. Abutting upper end 50 of the grommet 48 is a generally circular combined friction washer/arm stop 52 as will be described in detail hereinafter. The stop 52 will be described in detail hereinafter. The stop 52 is compressible against the grommet 48 by the circular rim 46 formed on the nut 40 A top plan view of the assembled connector 10 can be seen in FIG. 2.

Figure 3:
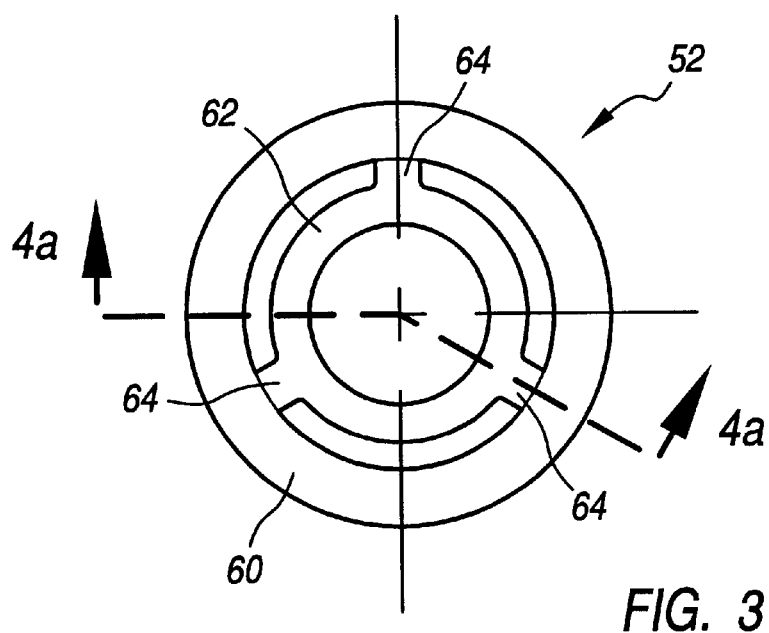
FIG. 3 is a top plan view of a novel friction washer/armor stop constructed according to the invention.
Figure 4A:
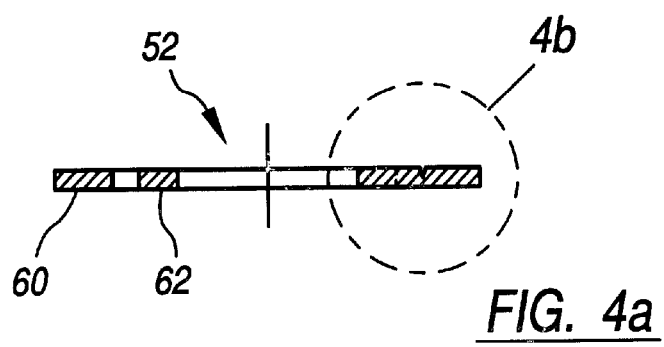
FIG. 4 is a cross-sectional view taken substantially along the line 4—4 of FIG. 3 and with a portion shown in enlarged scale.
Figure 4B:
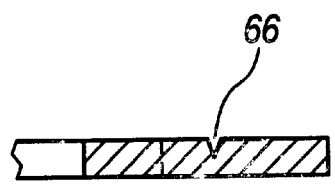

Turning now to FIGS. 3 and 4, the combined friction washer/armor stop 52 can be seen in detail. The stop 52 is preferably molded as a unitary member formed from a suitable plastic material such as NYLON. Stop 52 includes an outer annular portion 60 and an inner annular portion 62 spaced from outer portion 60 and connected thereto by a plurality of tab portions 64. As seen in FIG. 4, the tab portions 64 are connected to the outer portion 60 at score lines 66 such that the tab portions 64 can be selectively broken away with the inner portion 62 separated from the outer portion 60.

Figure 5:
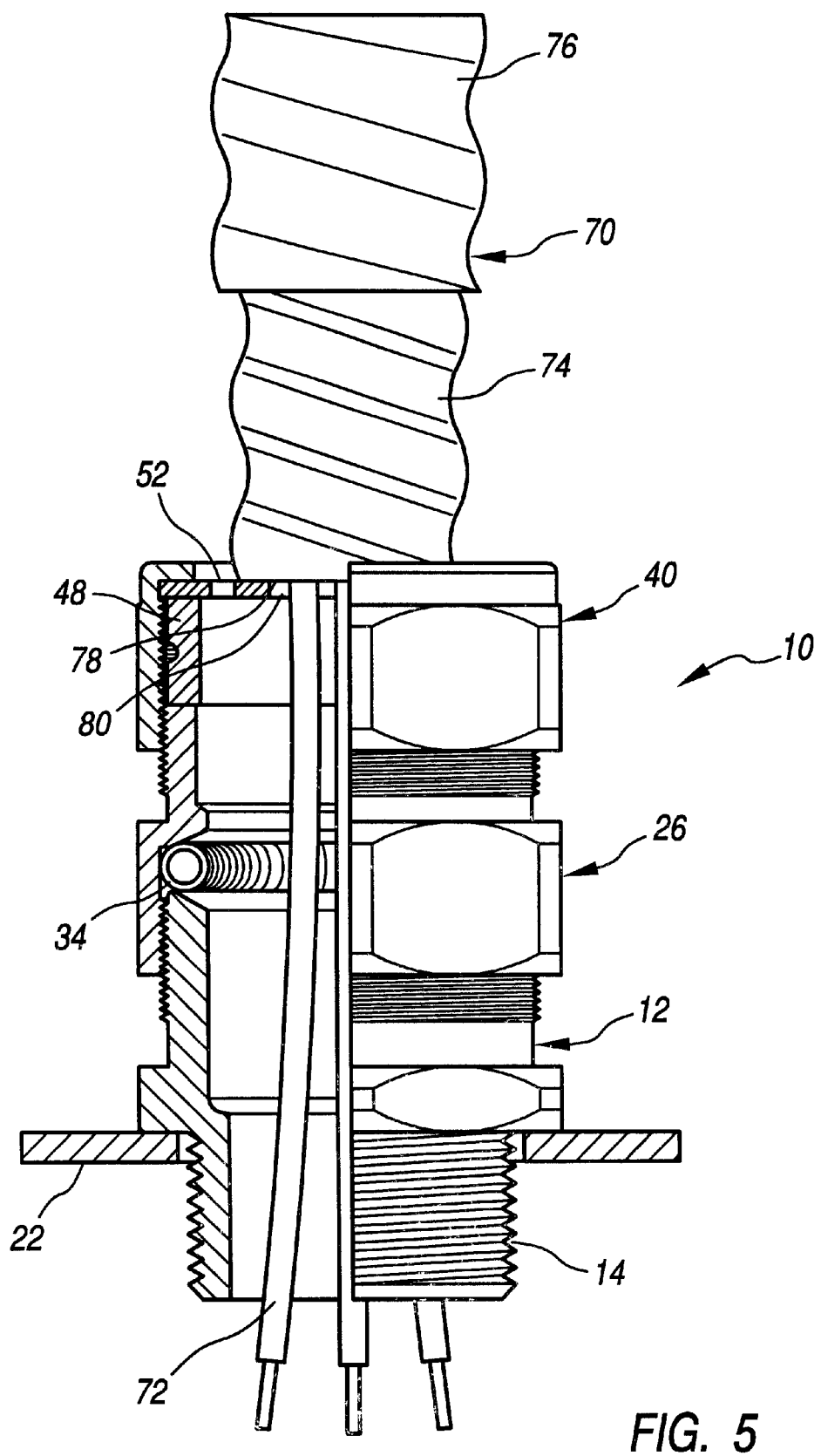
FIG. 5 is a side view, partially broken away, of the connector at an initial stage of insertion of an adorned cable.

FIG. 5 illustrates a connector 10 with an armored cable 70 comprising a plurality of electrical conductors 72 extending from a sheath of metal armor 74 which has been sealed in a jacket 76 preferably of plastic or rubber. The armor 74 and jacket 76 have been prepared for terminating the cable 70 by its insertion into the connector 10. Free end 78 of the armor 74 is shown as abutting the combined friction washer/armor stop 52 with the conductors 72 passing through circular opening 80 defined by the inner annular portion 62 of the stop 52.

Figure 6:
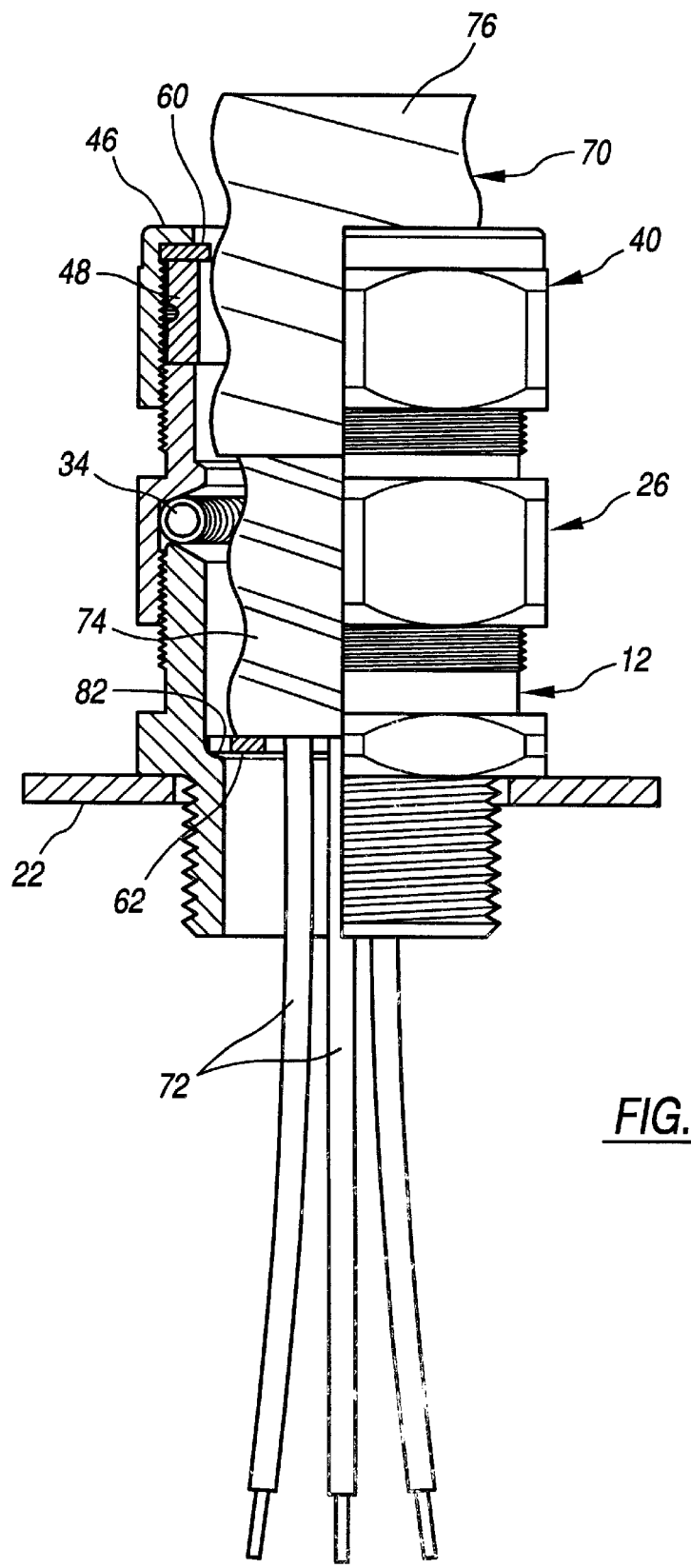
FIG. 6 is a side view, partially broken away of the connector at a final stage of insertion of an armored cable.

Upon termination of the cable 70, and as best seen in FIG. 6, the cable 70 is manually forced into the top of the connector 10 whereupon the cable armor 74 breaks away the inner annular portion 62 of the stop 52 at the score lines 66 of the tab portions 64. The cable 70 then inserts into the connector 10 to a point at which the annular portion 62 abuts an internal shoulder 82 of the body member 12 and stops the cable 70 from further insertion. The outer annular portion 60 remains seated against the grommet 48 and serves as a friction washer facilitating rotation of the upper nut 40 relative to the stationary grommet 48. Once the cable 70 has been fully inserted into the connector 10, the intermediate nut 26 may be tightened on the body member 12 causing the metal spring 34 to compress against the exposed armor 74 thereby facilitating an electrical ground between the armor 74 and the connector 10. Finally, the upper nut 40 may be tightened on the intermediate nut 26 causing the grommet to collapse against the jacket 76 of the cable 70 thus creating a moisture proof seal between the cable 70 and the connector 10.

Figure 7:
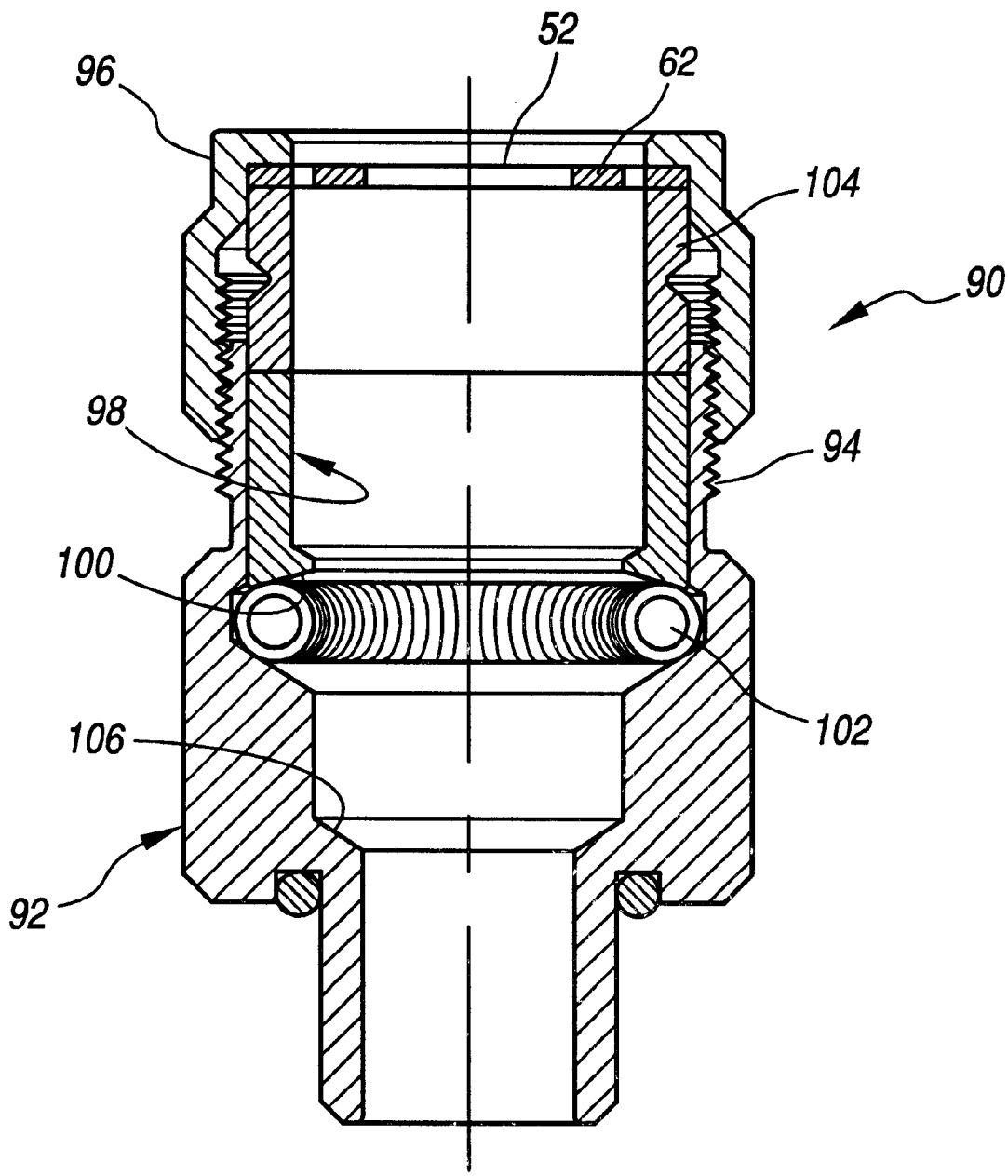
FIG. 7 is a cross-sectional view of an alternative connector having a two-body design.

FIG. 7 illustrates an alternative embodiment of the invention wherein a connector 90 is construed as a two-body design. The connector 90 includes a body member 92 having an upper threaded portion 94 to which a nut 96 may be screwed. However, in this arrangement an insert sleeve 98 having an inclined internal surface 100 is slidable within the body member 92 so as to compress a spring member 102 against the armor of the cable. A grommet 104 bears against the insert 98 when the nut 96 is tightened. In this embodiment the novel stop 52 may be similarly employed and operates as described above wherein annular portion 62 may break away and abut an annular shoulder portion 106 of the body member 92.

The versatility of the connector 10 or 90 can now be appreciated with reference particularly to FIG. 6. Where it is desired to terminate a cable 70 which, as shown in FIG. 6, is slightly undersized relative to the connector's internal dimensions and the size of the upper nut 40 rim 46 opening and the cable conductors 72 can freely pass through the annular portion 62, the cable 70 may simply be terminated to the connector 10 or 90 as described above by forcing the cable 70 to break away the annular portion 62 of the combined friction washer/armor stop 52, whereupon the portion 62 serves as an armor stop in cooperation with the shoulder 82 or 106 of the body member 12 or 92. At the same time the connector 10 or 90 is capable of terminating a larger cable wherein the conductors 72 cannot pass through the inner portion 62 by simple manual extrication of the portion 62 using a screwdriver, for example, and then allowing the shoulder 82 or 106 alone to serve as a stop for the armor. In either case, the annular portion 60 of the friction washer/armor stop 52 remains in place to compress the grommet 48.

The advantages of the novel combined friction washer/armor stop 52 can now also be appreciated. Because the connector 10 may be preassembled with the stop 52 in place, there is no likelihood that the stop 52 can become lost in use. In addition, there is no need to refer to documented specifications and measure the cable's armor to use the connector 10. Thus, savings in installation time and avoidance of improper installation are possible.

While the present invention has been described in connection with a preferred embodiment thereof it will be apparent to those skilled in the art that many changes and modifications may be made without departing from the true spirit and scope of the present invention. Accordingly, it is intended by the appended claims to cover all such changes and modifications that come within the spirit and scope of the invention.

What is claimed is:

1. An electrical connector assembly for terminating a metal clad cable having one or more electrical conductors enclosed in a metallic sheath comprising:

a body member having a central passage for receiving a free end of the cable;

an end nut attached to one end of the connector assembly;

a combined friction washer/armor stop positioned beneath the nut, said friction washer/armor stop including a break-away central annular stop portion;

wherein manual force of the free end of the cable against the combined friction washer/armor stop causes said stop portion to break free and travel inwardly of the body member whereupon it abuts an internal shoulder of the body member and prevents the free end of the cable from exiting the connector assembly.

2. The connector assembly of claim 1 wherein said friction washer compresses a grommet when said nut is tightened on said connector assembly.

3. The connector assembly of claim 1 wherein said combined friction washer/armor stop includes an outer annular portion serving as said friction washer and being connected to said central annular portion by a plurality of break-away tabs.

4. The connector assembly of claim 3 wherein said tabs are scored to facilitate said break-away action.

5. The connector assembly of claim 1 including an intermediate nut disposed between said end nut and said body member, said intermediate nut cooperating with said body member to compress electrical grounding means against said cable end.

6. The connector assembly of claim 5 wherein said grounding means comprises a metal spring.

7. The connector assembly of claim 1 wherein said combined friction washer/armor stop is made of plastic.

8. A method of terminating an armor clad cable having one or more electrical conductors enclosed in a metallic sheath, the method comprising the steps of:
   preparing a free end of the cable by removing a portion of the sheath thereby exposing one or more conductors;
   providing a connector having a central passage for receiving the end of the cable; said connector having a nut attached to an end thereof;
   positioning a stop member underneath the nut;
   inserting the end of the cable into the connector or such that the cable end breaks free a washer like portion of the stop member;
   further inserting the cable end and washer like portion of the stop member until the washer like portion abuts a shoulder portion of the connector and provides a positive stop for the metallic sheath within the connector.

9. The method claim 8 including the step of stripping from the cable a portion of moisture resistant jacket material prior to insertion of said cable end into said connector to expose said metallic sheath for electrical grounding of said sheath to said connector.

\* \* \* \* \*